(12) United States Patent
Wang et al.

(10) Patent No.: US 8,803,024 B2
(45) Date of Patent: Aug. 12, 2014

(54) ONLINE WELD INSPECTION AND REPAIR METHOD FOR RESISTANCE WELDING AND WELD-BONDING

(75) Inventors: Pei-Chung Wang, Shanghai (CN); Zongqing Lin, Shanghai (CN); Xinmin Lai, Shanghai (CN); Yansong Zhang, Shanghai (CN); Guanlong Chen, Shanghai (CN); Samuel P. Marin, Oakland Township, MI (US); Sheila A. Marin, legal representative, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1281 days.

(21) Appl. No.: 12/330,784

(22) Filed: Dec. 9, 2008

(65) Prior Publication Data

US 2009/0152253 A1 Jun. 18, 2009

Related U.S. Application Data

(60) Provisional application No. 61/013,294, filed on Dec. 12, 2007.

(51) Int. Cl.
*B23K 9/00* (2006.01)
*G01M 19/00* (2006.01)

(52) U.S. Cl.
USPC ..... 219/117.1; 219/109; 219/110; 219/137 R; 73/865.8

(58) Field of Classification Search
CPC ..................................................... B23K 31/12
USPC ........... 219/109, 110, 117.1, 137 R; 73/865.8
See application file for complete search history.

(56) References Cited

U.S. PATENT DOCUMENTS

| 4,734,555 A * | 3/1988 | Ferguson ....................... 219/109 |
| 2005/0045597 A1 * | 3/2005 | Wang et al. ................... 219/110 |
| 2008/0128394 A1 * | 6/2008 | Wang et al. ................ 219/117.1 |

* cited by examiner

*Primary Examiner* — Jianying Atkisson

(57) ABSTRACT

A method to diagnose weld integrity in a welding process includes monitoring a weld indentation characteristic, comparing the monitored weld indentation characteristic to a threshold weld indentation characteristic, and identifying a discrepant weld when the weld indentation characteristic comparison shows the monitored weld indentation characteristic violates the threshold weld indentation characteristic.

15 Claims, 5 Drawing Sheets

ONLINE WELD INSPECTION AND REPAIR METHOD FOR RESISTANCE WELDING AND WELD-BONDING

CROSS REFERENCE TO RELATED APPLICATIONS

This application claims the benefit of U.S. Provisional Application No. 61/013,294 filed on Dec. 12, 2007 which is hereby incorporated herein by reference.

TECHNICAL FIELD

This disclosure relates to welding processes.

BACKGROUND

Resistance welding is a known process whereby electrical current is passed between two electrodes. Work pieces to be joined, usually made of metallic pieces, are placed between the electrodes, a clamping force is applied to the electrodes, and current flowing between the electrodes passes through the work pieces. The electrical resistance in and between the work pieces, when exposed to the current, creates heat sufficient to locally melt the work pieces. The molten portions of the work pieces are allowed to cool, creating a welded joint between the work pieces.

Spot welding is a known type of resistance welding. It frequently involves two substantially circular copper electrodes that come close to each other, leaving a gap for work pieces to be inserted therebetween. As current is applied, and the circular electrodes create a circular weld pattern to the work pieces. Common techniques utilize a series of spot welds to join pieces along a flange.

Other types of, or combinations using, resistance welding are known. Weld-bonding is one technique wherein resistance welding is combined with a structural adhesive to complementarily affix one component to another. Projection welding is another technique wherein a projection is utilized to, at least initially, localize the current flow between work pieces in order to create precise weld geometries and reduce the impact of welding temperatures on the rest of the work pieces away from the joint. Resistance seam welding is a method known in the art and is applied through a region of work pieces to be connected.

Joint strength or the ability of the joint to experience stress is a property which can be affected by many factors. Stress experienced by two work pieces at a welded joint can take many forms, including axial stress, shear stress, torsional stress, and bending moment. The relationship of stress to strain and the resulting predictable failure for a workpiece of known geometry and material properties is well known in the art. Factors influencing joint strength include weld geometry, weld spacing, weld quality, and properties of the work pieces such as material composition and thickness. The appropriate locations and properties of welds along a joint may be determined experimentally, empirically, predictively, through modeling or other techniques adequate to accurately predict reactions of the work pieces to the application of stress. However, variability in welding processes can cause weld locations to change from one set of work pieces to the next. Weld locations affect weld strength and weld quality, impacting how a force applied to the work pieces translates into stresses and resulting strains upon the welds. As a result, understanding weld location variability is important to determining joint strength.

SUMMARY

A method includes monitoring a weld indentation characteristic, comparing the monitored weld indentation characteristic to a threshold weld indentation characteristic, and identifying a discrepant weld when the weld indentation characteristic comparison shows the monitored weld indentation characteristic violates the threshold weld indentation characteristic.

BRIEF DESCRIPTION OF THE DRAWINGS

One or more embodiments will now be described, by way of example, with reference to the accompanying drawings, in which.

DETAILED DESCRIPTION

Figure 1:
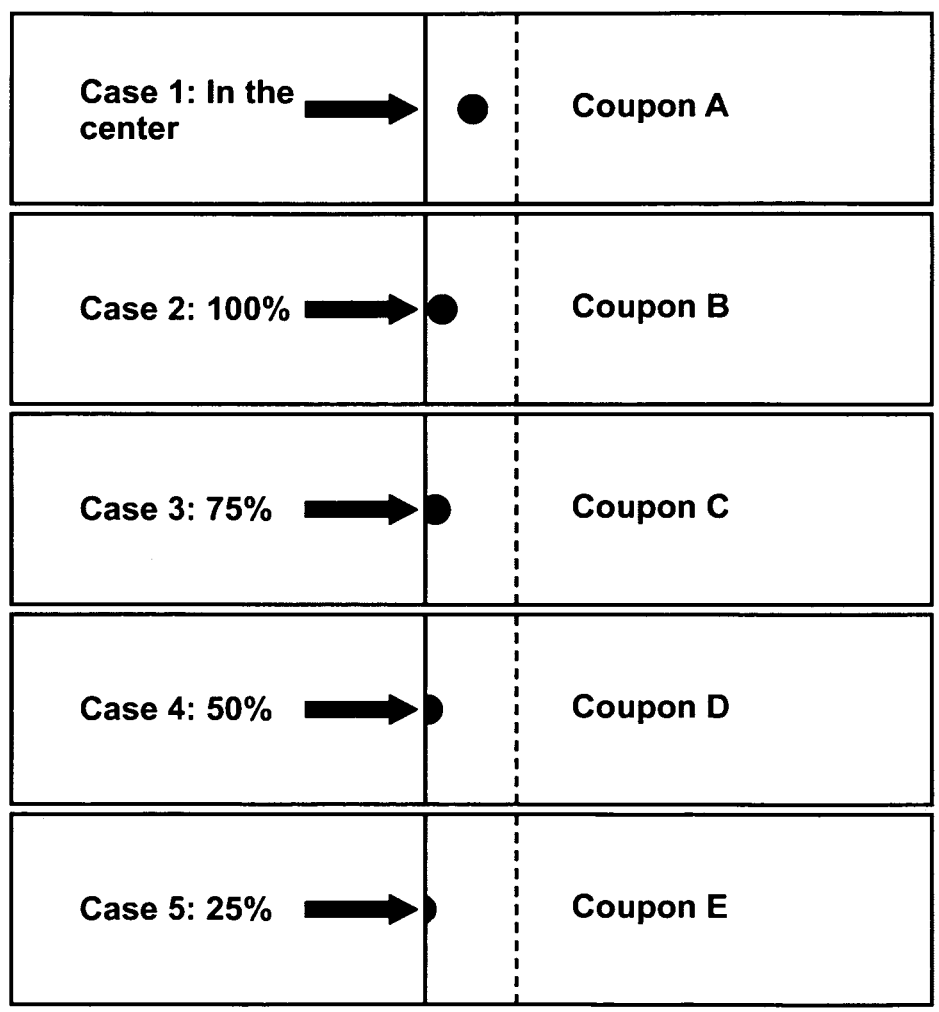
FIG. 1 is an illustration of various exemplary coupons displaying spot welds in different locations of an overlap in accordance with the present disclosure.

Referring now to the drawings, wherein the showings are for the purpose of illustrating certain exemplary embodiments only and not for the purpose of limiting the same, FIG. 1 illustrates a series of work pieces with spot welds in different locations in accordance with the present disclosure. As mentioned above, manufacturing process variability can lead to weld location variability, affecting resulting joint strength. Each sample or coupon includes two flat work pieces situated to create an overlap. A spot weld is positioned on each overlap in order to create a joint between the work pieces. Coupon A describes case 1, in which the spot weld is located in the center of the overlap. Coupons B through E illustrate cases 2 through 5, displaying edge welds or welds which contact the edge of the overlap. The percentages indicated denote the percentage of weld area of the intended circular weld effected on the samples in the overlap. The migration of welds as illustrated all moved toward the left, but it will be appreciated that a weld would just as equally be considered an edge weld if it existed tangential to or overlapping with the dotted line representing the edge of the lower work piece to the right of center.

The production of effective resistance welds is a well known art. Welding engineering includes known methods, procedures, and best practices known to produce welds of appropriate strength and quality. Engineering mechanics includes known principles regarding the study of forces acting upon a workpiece, the resulting internal stresses upon the workpiece, and the associated strain or deformation experienced by the workpiece. Materials engineering includes known principles regarding strength of materials, strength of metallic objects resulting from molten metals cooling at certain rates and in certain environments, and the compatibility of materials to be welded together. Principles and techniques involved in creating proper welds are well known, and will not be explored in detail herein. For the purposes of this disclosure, it is assumed that proper welding practices have been employed, and that the welds applied in all exemplary embodiments have been created through known methods.

Figure 2:
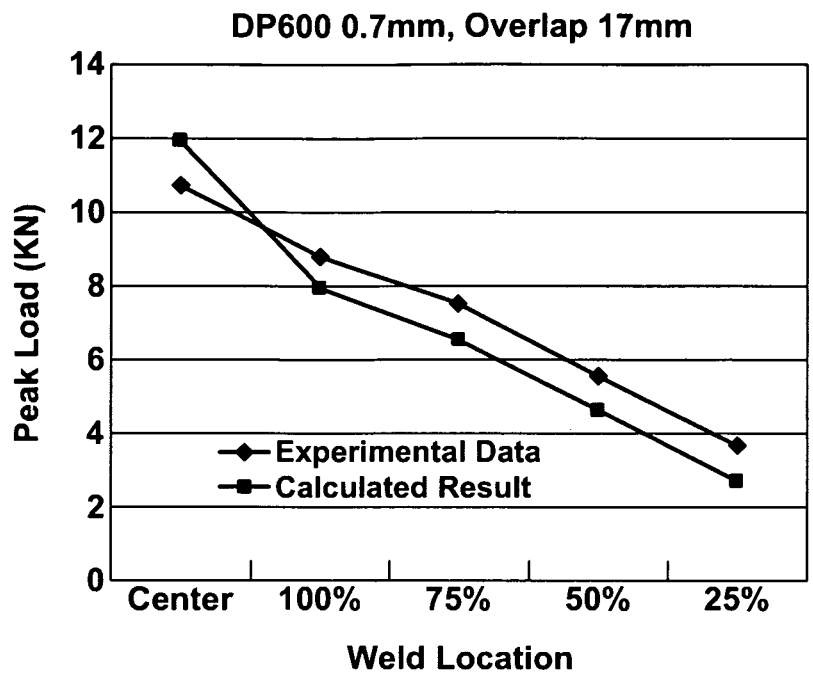
FIG. 2 is a graphical representation of exemplary test results describing peak load tested on sample work pieces against weld location with respect to an overlap in accordance with the present disclosure.

FIG. 2 illustrates test results displaying joint strength data for a series of coupons with different weld locations, in accordance with the present disclosure. Experimental data is displayed against data predicted by computer analysis of models of the work pieces. A comparison of the data shows strong correlation of a trend indicating that a spot weld located in the center of the overlap has the highest strength, with consistently or approximately linearly decreasing weld strength as first the weld is moved tangentially next to the edge and then is steadily reduced over the edge as described in the coupons of FIG. 1.

Figure 3:
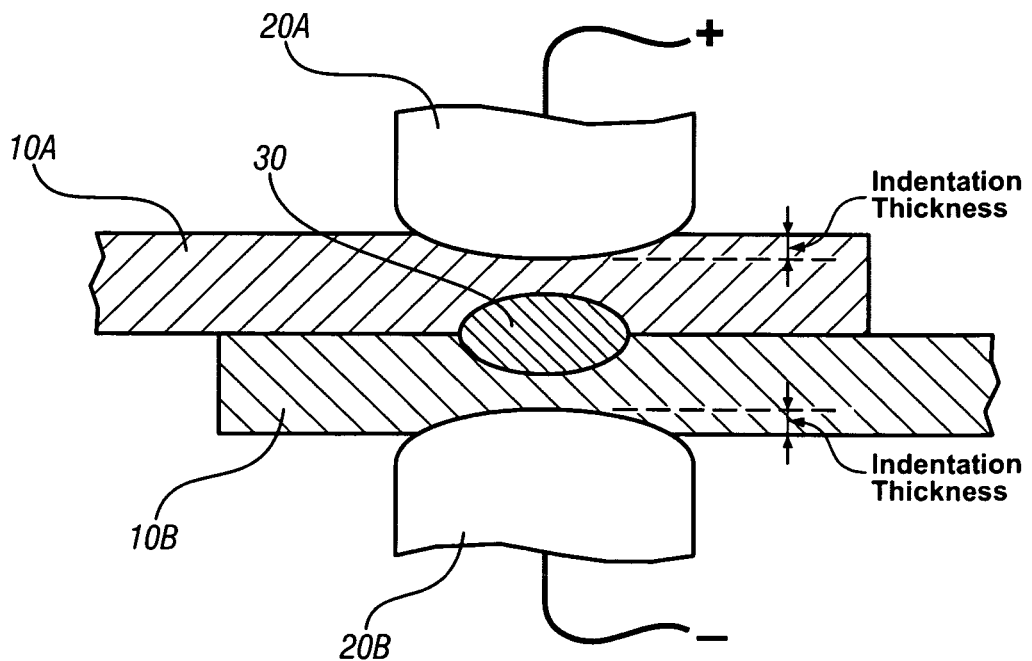
FIG. 3 is a sectional representation of an exemplary weld located in the center of an overlap in accordance with the present disclosure.

FIG. 3 illustrates a sectional view of two work pieces being resistance welded together in the center of an overlap in accordance with the present disclosure. Work pieces 10A and 10B in this exemplary embodiment are flat pieces with main sections projecting off in opposite directions. It should be appreciated that the welding techniques described herein and the work pieces described can take many embodiments and are not intended to be limited to the specific examples illustrated herein. For example, the two edges could be lined up, and the main bodies of work pieces 10A and 10B could extend off in the same direction. The resistance welding technique used in the method can take many forms, including spot welding, weld-bonding, resistance seam welding, and projection welding. Many forms of resistance welding are known, and specific details of each will not be described herein. The methods utilized herein can be used in any welding process wherein two pieces are affixed together by melting together portions of work pieces resulting in a deformation or indentation of the work pieces in a predictable manner. The disclosure is not intended to be limited to the particular welding processes described herein. Additionally, two work pieces are illustrated. However, it will be appreciated that multiple work pieces could be located and joined together similarly according to methods described herein. Electrodes 20A and 20B describe exemplary tools which would be used to pass a current through the work pieces to create a weld. Weld 30 represents the combination of material originally from work pieces 10A and 10B which is melted into a single mass, which when cooled becomes the weld joint between work pieces 10A and 10B. As electrodes 20A and 20B come into contact with work pieces 10A and 10B, the current flowing through the work pieces softens the material, and a clamping force applied to the electrodes in combination with the softened material in the work pieces causes an indentation to form on each of the work pieces. The flat planes of material surrounding the electrodes and the resulting weld provide stability and maintain the orientation of the molten and softened material to the surrounding work pieces.

Figure 4:
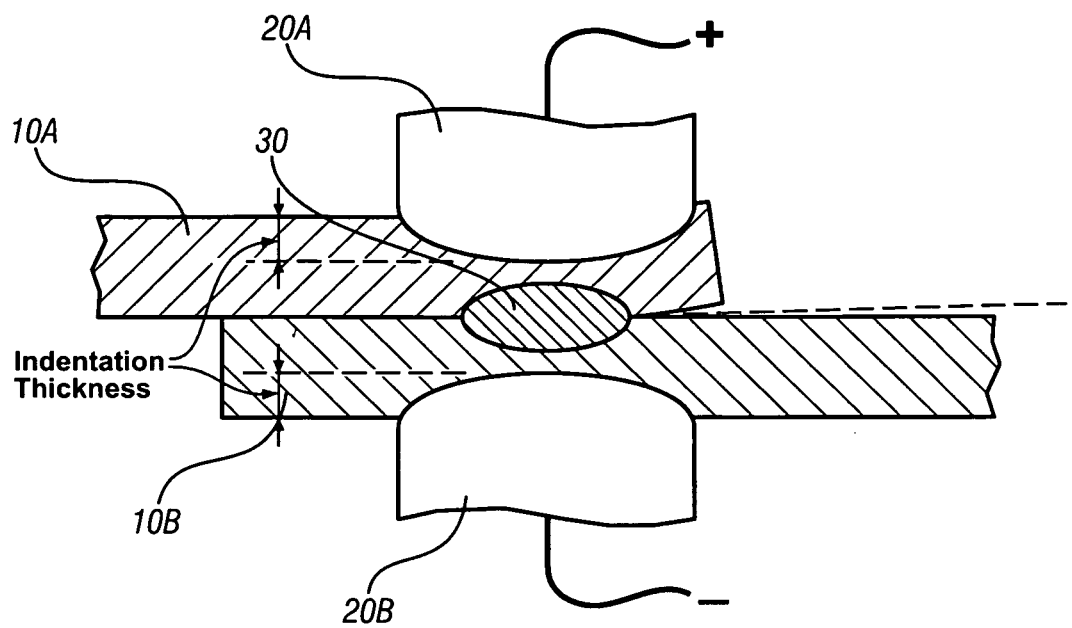
FIG. 4 is a sectional representation of an exemplary weld located in proximity to the edge of a work piece in accordance with the present disclosure.
Figure 5:
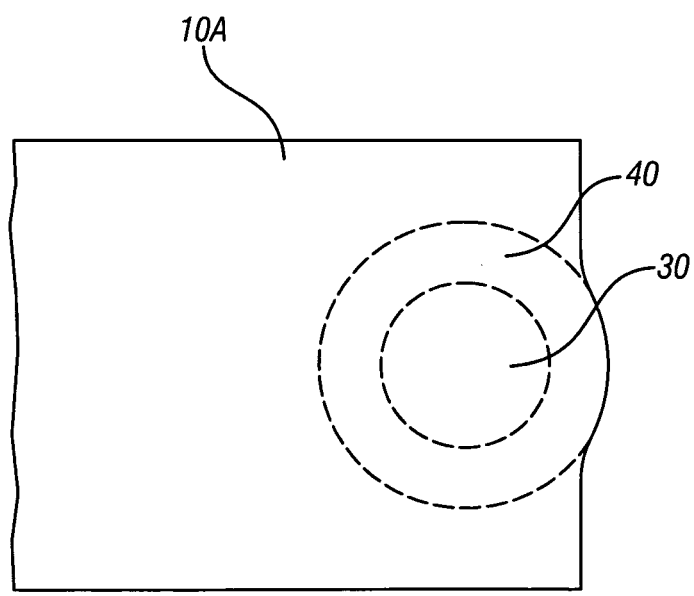
FIG. 5 is an illustration of an exemplary work piece as affected by a weld in proximity to the edge of the work piece in accordance with the present disclosure.

FIG. 4 illustrates a sectional view of two work pieces being resistance welded together close to an edge of an overlap in accordance with the present disclosure. As shown in FIG. 3, electrodes 20A and 20B come into contact with work pieces 10A and 10B. As current passes through the work pieces, the material softens, weld 30 is created, and the soft material in combination with a clamping force applied to the electrodes causes an indentation to form on each of the work pieces. However, where in the exemplary embodiment of FIG. 3, the flat planes of material surrounding the electrodes and the resulting weld provided stability for the molten material of the weld to stay in place, the proximity to the electrodes and of the weld to the edge of work piece 10A creates instability where softened or molten material from the work pieces can deform outwards past the edge. Results of this deformation can be seen in FIG. 5, where a top view of work piece 10A after the welding process is illustrated in accordance with the present disclosure. As mentioned above, the effects of the current applied and the clamping force of the electrodes, in combination with the proximity to the edge of the work piece, causes instability in the material of the work piece. FIG. 5 shows how weld 30 and a softened material area 40 react to being open to the edge of work piece 10A, where as the material of the work piece changes from a solid to some degree closer to a liquid, the material is pushed out of its normal position past the edge of the work piece. Returning to FIG. 4, the instability in the material of the work pieces caused by the weld in close proximity to the edge allows material to move away from the electrodes that would in the center of an overlap be kept in place. This movement of material leads to less material remaining between the electrodes and around the resulting weld, causing increased indentation thickness and deformation in the resulting alignment of the work pieces. The resulting weld 30 is weaker and leads to the experimental and calculated results described in FIG. 2.

Figure 6:
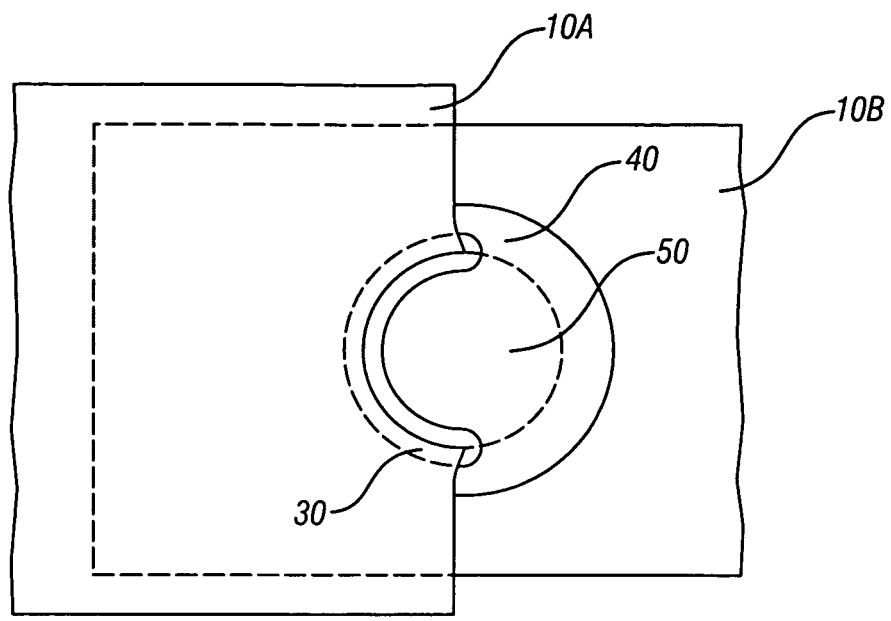
FIG. 6 is an illustration of exemplary work pieces as affected by a weld overlapping the edge of one work piece in accordance with the present disclosure.

The exemplary embodiment of work pieces 10A and 10B described in FIGS. 4 and 5 were in close proximity or tangential to the edge, as in coupon B illustrated in FIG. 1. As the electrodes 20A and 20B and the resulting weld 30 move past the edge of a work piece, as described in coupons C, D, and E of FIG. 1, instability in the softened material and the molten material of the weld increases. FIG. 6 illustrates an exemplary embodiment of a spot weld resulting from electrodes lined up partially off the edge of work piece 10A in accordance with the present disclosure. As in the exemplary embodiment described in FIGS. 4 and 5, material from work piece 10A, placed between a pair of electrodes and welded together through application of a current, has deformed and extended past the original edge of work piece 10A. Material from work pieces 10A and 10B has melted together to form weld 30. However, in this exemplary embodiment, some of the material originally part of workpiece 10A, has escaped from the weld area and has either been left as non-functional weld residue 50 or has been expelled in the welding process. Those having ordinary skill in the art will appreciate that the reduction in area of weld 30 and the large amount of material lost to the non-functional weld residue 50 or expelled reduces the strength of the resulting weld joint in comparison to the welds illustrated in FIGS. 3 and 4. As the alignment of the electrodes goes further off the edge of the work pieces, the weld strength will continue to decrease as the resulting quality of weld 30 decreases.

Figure 7:
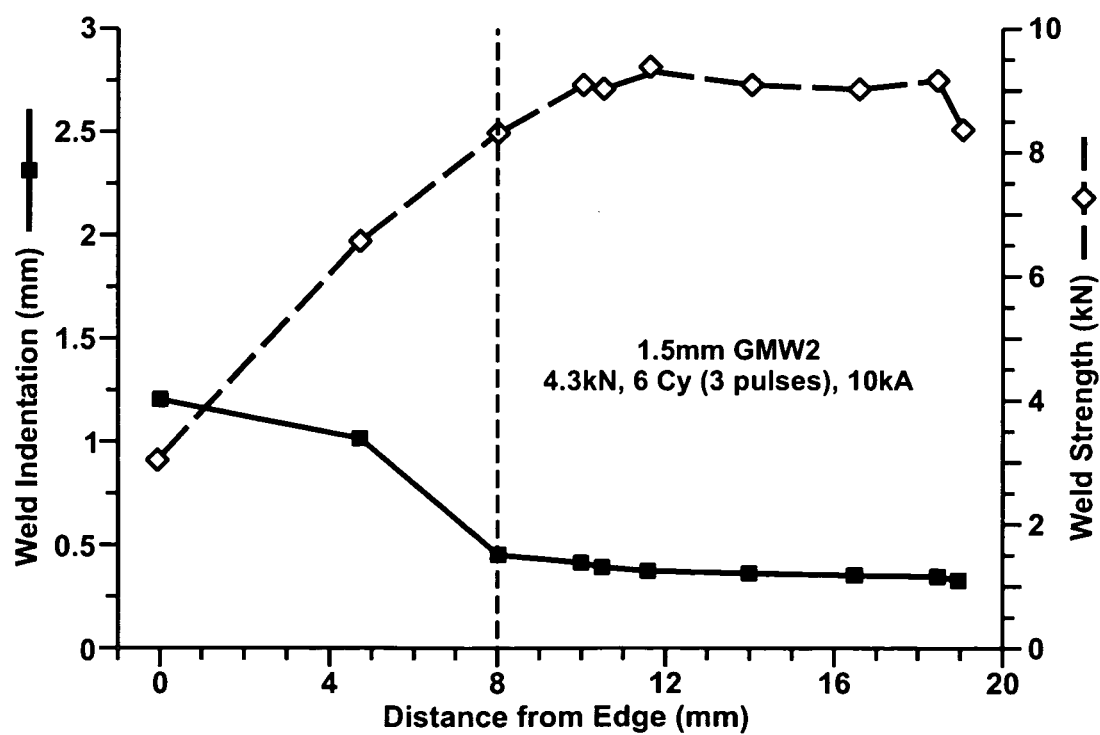
FIG. 7 is a graphical representation of exemplary test results displaying a relationship between weld distance from the edge of a work piece, weld indentation, and weld strength in accordance with the present disclosure.

FIG. 7 illustrates exemplary test results showing a relationship of distance from the edge of a work piece to both weld indentation and resulting weld strength in accordance with the present disclosure. Distance from the edge of the work piece in this particular exemplary test is measured from the center of the electrode to the edge. So long as the distance from the edge of the work piece maintains a minimum distance where the softened and molten material remains contained in a stable plane of material, the weld indentation and resulting weld strength remain relatively stable. However, a point can be seen in the exemplary data around 8 mm and lower from the edge, where the weld indentation sharply rises and the weld strength decreases precipitously. It should be noted that 8 mm is a threshold distance for the sample pieces tested, but this value will change as a function of the particular work pieces and weld process employed. Such a value can be determined through testing of samples or predicted through any method sufficient to comprehend the strength of the resulting weld joint. As described above, the proximity of the electrodes and the resulting weld to the edge of the workpiece creates instability and decreases the quality of the resulting weld. This graph demonstrates a strong correlation between distance from the edge, weld indentation, and resulting weld strength.

While there exists evidence of strong correlation between distance from the edge of the workpiece and resulting weld strength, parts created in the welding process can be complicated, large, and unwieldy. The size and orientation of the parts may inhibit taking measurements from the weld location to the closest edge. Also, as described above, the weld can move close to different edges of the work pieces. The exemplary embodiments described above were simple planes with straight edges, however, work pieces in practical applications are frequently complex, employ curved or complex shapes, and variability in the manufacturing process can move in many directions. However, the effect of moving close to an edge of a work piece upon the thickness of the weld indentation will remain steady. A method is disclosed to detect and repair edge welds based upon weld indentation thickness.

While the exemplary processes illustrated above were spot welds, the methods described below may work equally well in resistance welds of different shapes and configurations, and are not intended to be limited merely to spot welds. Welds of non-circular or larger geometry might require multiple measures of indentation thickness to apply the methodology described herein.

Referring back to FIG. 7, as described above, too great of a weld indentation thickness value indicates that the weld occurred too close to an edge. However, it can also be seen from the information in the chart that the weld indentation thickness does not go below a particular level regardless of distance from the edge. The application of current and the clamping force on the electrodes necessary to produce a proper resistance weld will produce weld indentation thicknesses of at least a certain value. By comparing measured weld indentation thicknesses to a minimum weld indentation thickness, a determination can be performed whether some anomaly in the welding process prevented a proper weld from taking place.

Once estimated, weld integrity can be used to adjust welding operations on the work pieces to compensate for disparate weld readings. Weld thickness readings or estimations can be made in real-time, allowing for the particular welding work station to adjust and contain any actions within that work station or minimize effects upon other work stations downstream in the manufacturing process. For example, a weld thickness sensor can be constructed integrally with the machinery deploying the electrodes to the work pieces in order to get a weld thickness measurement immediately after the weld is created. The weld thickness sensor would be signally connected to a weld work station. Alternatively, weld thickness may be estimated by tracking movement of the electrodes and inferring weld thickness based on electrode movement. Alternatively, real-time tracking of weld thickness allows calculation of a first derivative of weld thickness, denoted by I, with respect to time, denoted by t; the derivative yielding dI/dt or instantaneous weld thickness change. This measured instantaneous weld thickness change can be compared with expected results, and if the electrodes are creating an indentation too quickly or too slowly, steps can be taken during the weld including changing welder parameters or aborting the weld for a repair step. One having skill in the art will appreciate that any similarly available measure of indentation or movement of the electrodes, for example, integration of dI/dt as a measure of indentation through a time or alternatively a second derivative of weld thickness with respect to time, can be used to evaluate the weld. In this way, an indication of the weld thickness or a weld indentation characteristic can be tracked and used to diagnose weld integrity.

In order to monitor and process weld thickness data collected by the methods described above, an exemplary weld work station can comprise a data processing computer, a graphical user interface, and a non-volatile memory storage area capable of storing threshold weld indentation characteristic values for a plurality of work pieces. The weld work station is operably and signally connected to a resistance welding control station in order to receive weld thickness data from a sensor, encoder, or any other weld thickness detection device, and can be capable to direct weld gun motion through weld gun electrode deployment machinery. The weld work station processor would have software executable to interpret and manipulate weld thickness data from the weld thickness detection device, and compare monitored weld thickness values with stored threshold weld thickness values.

Figure 8:
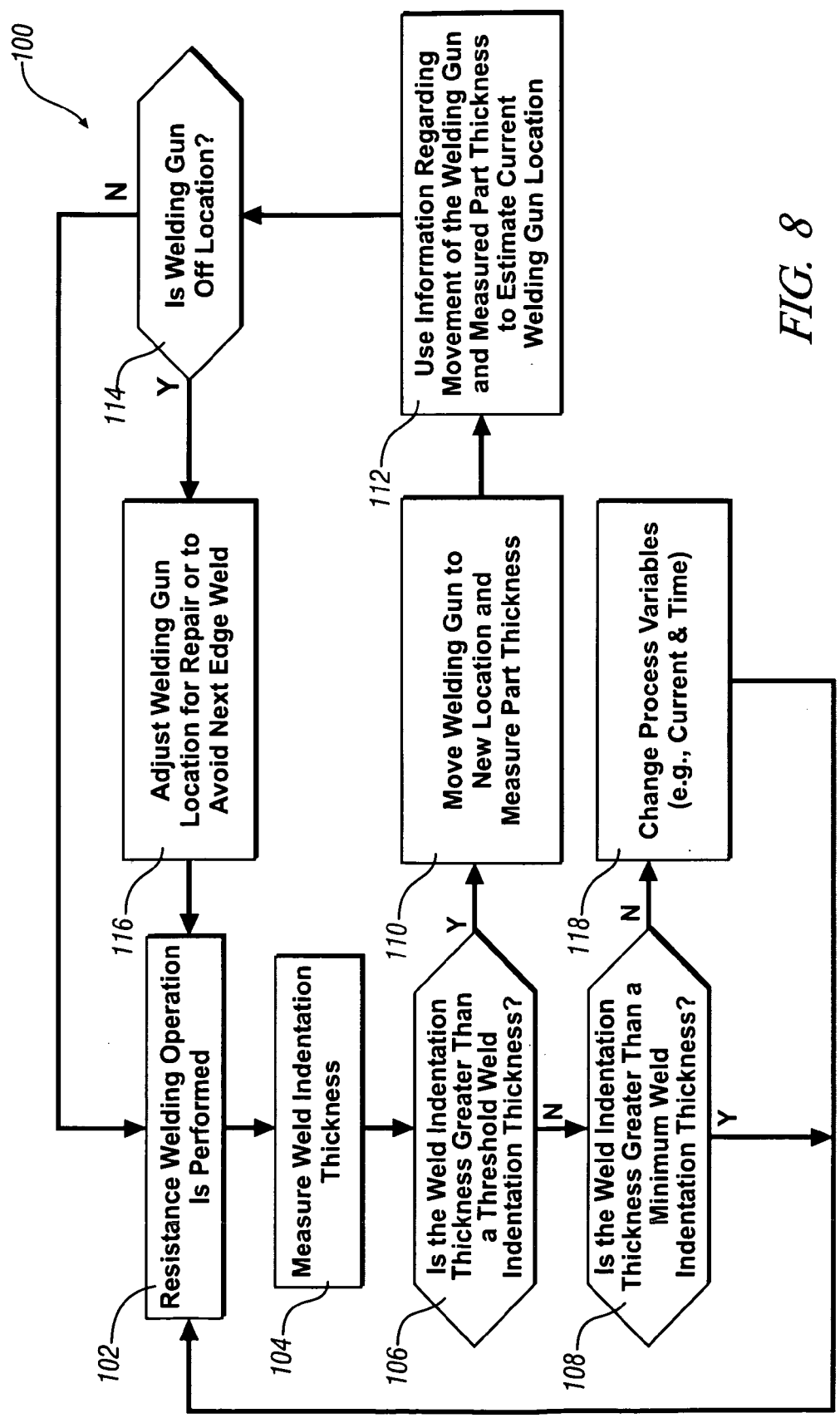
FIG. 8 is a flowchart demonstrating an exemplary process utilizing a method to detect and repair edge welds based upon weld indentation thickness in accordance with the present disclosure.

FIG. 8 illustrates process 100 wherein an exemplary method to detect and repair edge welds based upon weld indentation thickness is utilized in accordance with the present disclosure. In step 102, a set of work pieces are aligned in a manufacturing process, and a resistance weld is performed upon the work pieces. In step 104, a measurement is then taken of weld indentation thickness, and in step 106, the measured weld indentation thickness is compared to a threshold weld indentation thickness. If the measured weld indentation thickness is not greater than the threshold weld indentation thickness, then the relationship of weld indentation thickness to distance from the edge of the work pieces and resulting weld strength described above indicate that the weld was not performed too close to an edge, and the process moved on to step 108. If the measured weld indentation thickness is greater than the threshold weld indentation thickness, then the relationship described above indicates that manufacturing variability has caused the weld to be performed too close to the edge of the workpiece, that a low quality weld has been performed, and that the process must go to step 110 to determine a containment or repair action. Step 110 adjusts the welding gun containing the necessary electrodes and instrumentation used to measure workpiece thickness to a new location and workpiece thickness is measured. The detection of workpiece and electrode location and control of movement may be generically set, may involve a recalibration to a coordinate system based on tooling or the workpiece, may be directed by the movement of deployment machinery controlled with an encoder of electric servomotor (i.e., servo gun) or other location sensing methods (LVDT and laser), or may employ other means to select the direction of movement. At step 112, information regarding the movement of the gun and the measured workpiece thickness at step 110 is used to determine or estimate current gun location. At step 114, a determination is made as to whether the gun is currently in a location to perform a repair weld. If the gun is determined to be in a proper location, then the process is reinitiated to step 102. If the gun is determined to be in an improper location, then step 116 undertakes some procedure to find a proper location to perform a repair weld or the weld location is skipped, and containment actions are taken to ensure the quality of the next weld. Actions in 116 may involve moving the gun by logic similar to the previous movement as described in step 110 or an overall algorithm can be applied to determine the proper containment action. For example, a factor of safety could be employed in programming welds in a workpiece, wherein if a single weld malfunction occurs during manufacture, the workpiece is still deemed acceptable and no repair function is needed. Alternatively, a workpiece with a failed weld can be flagged and put through a separate repair loop in the process, flagged and identified for individual inspection and repair off line, or otherwise contained. Upon passing the weld indentation thickness comparison in step 106, the workpiece can be presumed to pass, or as is illustrated in process 100, at step 108 a presumption may be applied that the weld location has to have at least a minimum weld indentation thickness to indicate that a healthy weld was performed at that location. As described above, the measured weld indentation thickness can be compared to a minimum weld indentation thickness to determine whether something interfered with the creation of a proper weld. If the measured weld indentation thickness is smaller than the minimum weld indentation thickness then the weld is considered improper, and at step 118, the weld process variables such as weld time and current applied are adjusted and the process is reinitiated at step 102. In alternative to step 118, a failure in the comparison at step 108 could initiate other containment actions as described above in step 116 or other containment means could be applied. If the measured weld indentation thickness at step 108 is greater than the minimum weld indentation thickness, then the weld is deemed acceptable, and the process is reinitiated at step 102 for the next weld point.

The threshold weld indentation thickness and minimum weld indentation thickness are values that will change from application to application and can be determined experimentally, empirically, predictively, through modeling or other techniques adequate to accurately predict resulting strength in the weld joint.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to diagnose weld integrity in a welding process to create a weld upon a plurality of work pieces, comprising:
   using a weld work station computer to:
      monitor a weld indentation characteristic comprising monitoring real-time data describing movement of weld work station weld electrodes, wherein the real-time data is generated by monitoring movement of deployment machinery for the electrodes using a sensor;
      obtain, from test data of welds upon test work pieces, a threshold weld indentation characteristic based upon a relationship whereat indentation values sharply exceeding the threshold weld indentation characteristic correspond to distances from a center of the weld electrode to an edge of overlap of the test work pieces to be less than a minimum threshold distance resulting in a low quality weld strength, wherein the low quality weld strength is indicative of instability in the weld upon the test work pieces whereat molten weld material moves outward past the edge of overlap of the test work pieces;
      compare the monitored weld indentation characteristic to the threshold weld indentation characteristic;
      identify a weld having low quality weld strength when the monitored weld indentation characteristic exceeds the threshold weld indentation characteristic;
      generate a warning based on the identified weld having low quality weld strength.

2. The method of claim 1, wherein the welding process comprises a resistance welding process; and wherein the monitored weld indentation characteristic is weld indentation thickness.

3. The method of claim 2, wherein the weld indentation thickness is determined coincidentally with the welding process.

4. The method of claim 1, wherein the monitored weld indentation characteristic is instantaneous weld thickness change.

5. The method of claim 4, wherein the instantaneous weld thickness change is a first derivative calculation of weld indentation depth with respect to time based on the real-time data.

6. The method of claim 5, wherein the first derivative calculation is based upon integration of instantaneous weld thickness change.

7. The method of claim 1, wherein said welding process comprises a weld-bonding process.

8. The method of claim 1, wherein said welding process comprises a resistance seam welding process.

9. The method of claim 1, wherein said welding process comprises a projection welding process.

10. A method to diagnose weld integrity and implement a repair weld in a resistance welding process, comprising:
    using a weld work station computer to:
       monitor a weld indentation characteristic comprising monitoring real-time data describing movement of weld work station weld electrodes, wherein the real-time data is generated by monitoring movement of deployment machinery for the electrodes using a sensor;
       obtain, from test data of welds upon test work pieces, a threshold weld indentation characteristic based upon a relationship whereat indentation values sharply exceeding the threshold weld indentation characteristic correspond to distances from a center of the weld electrode to an edge of overlap of the test work pieces to be less than a minimum threshold distance resulting in a low quality weld strength, wherein the low quality weld strength is indicative of instability in the weld upon the test work pieces whereat molten weld material moves outward past the edge of overlap of the test work pieces;
       compare the monitored weld indentation characteristic to the threshold weld indentation characteristic;
       identify a weld having low quality weld strength when the monitored weld indentation characteristic exceeds the threshold weld indentation characteristic;
       generate a warning based on the identified weld having low quality weld strength;

moving the weld electrodes to an alternative location on the workpiece based upon the warning; and applying the repair weld.

11. The method of claim 10, wherein the monitored weld indentation characteristic is weld indentation thickness.

12. The method of claim 10, wherein the monitored weld indentation characteristic is instantaneous weld thickness change.

13. The method of claim 10, wherein moving the weld electrodes to an alternative location on the workpiece comprises:

adjusting the position of the weld electrodes;

identifying the location of the weld electrodes based on workpiece thickness; and determining the weld electrodes are in a proper repair weld location.

14. The method of claim 10, wherein the weld electrodes are moved to an alternative location on the workpiece based on a coordinate system based on workpiece geometry.

15. The method of claim 10, wherein the weld electrodes are moved to an alternative location on the workpiece based on a coordinate system based on tooling constraints.

\* \* \* \* \*